US005657036A

United States Patent [19]

Markandey et al.

[11] Patent Number: 5,657,036

[45] Date of Patent: Aug. 12, 1997

[54] COLOR DISPLAY SYSTEM WITH SPATIAL LIGHT MODULATOR(S) HAVING COLOR-TO COLOR VARIATIONS FOR SPLIT RESET

[75] Inventors: Vishal Markandey, Dallas, Tex.; Robert J. Gove, Los Gatos, Calif.

[73] Assignee: Texas Instruments Incorporated, Dallas, Tex.

[21] Appl. No.: 429,388

[22] Filed: Apr. 26, 1995

[51] Int. Cl.$^6$ .......... H04N 9/31

[52] U.S. Cl. .......... 345/85; 348/771

[58] Field of Search .......... 345/85, 84, 89; 348/771

[56] References Cited

U.S. PATENT DOCUMENTS 5,079,544 1/1992 DeMond et al. .......... 340/701
5,233,385 8/1993 Sampsell .......... 355/35
5,448,314 9/1995 Heimbuck et al. .......... 345/85
5,528,317 6/1996 Gove et al. .......... 345/89

*Primary Examiner*—Mark R. Powell
*Attorney, Agent, or Firm*—Julie L. Reed; James C. Kesterson; Richard L. Donaldson

[57] ABSTRACT

A method of reducing artifacts in SLM-based display systems (10, 20), whose images are based on data displayed by bit-weight for pulse-width modulated intensity levels. The method can be used with a multiple spatial light modulators SLM system (20), which concurrently displays images of different colors, or with a single SLM system (10), which generates differently colored images sequentially during each frame period. For a multiple SLM system (20), the method is used with SLMs (14) that are memory-multiplexed, having "reset groups" that are loaded and displayed at different times. Corresponding rows of the SLM(s)s are associated with different reset groups.

14 Claims, 2 Drawing Sheets

COLOR DISPLAY SYSTEM WITH SPATIAL LIGHT MODULATOR(S) HAVING COLOR-TO COLOR VARIATIONS FOR SPLIT RESET

TECHNICAL FIELD OF THE INVENTION

This invention relates to image display systems, and more particularly to a method of reducing artifacts in a display system that uses one or more spatial light modulators for generating a color display.

BACKGROUND OF THE INVENTION

Image display systems based on spatial light modulators (SLMs) are increasingly being used as an alternative to image display systems based on cathode ray tubes. As used for image display applications, SLMs are arrays of pixel-generating elements that emit or reflect light to an image plane. The pixel-generating elements are often themselves referred to as "pixels", as distinguished from pixels of the image. This terminology is clear from context, so long as it is understood that more than one pixel of the SLM array can be used to generate a pixel of the image.

Digital micro-mirror devices (DMDs) are one type of SLM. A DMD has an array of hundreds or thousands of tiny tilting mirrors. To permit the mirrors to tilt, each is attached to one or more hinges mounted on support posts, and spaced by means of an air gap over underlying control circuitry. The control circuitry provides electrostatic forces, which cause each mirror to selectively tilt. Each mirror element provides the intensity for one pixel of the image.

The mirror elements of the DMD are individually addressable, such that the image is defined by which pixels are on or off at a given time. For addressing mirror elements of the DMD, each mirror element is in communication with a memory cell that stores a bit of data that determines the on or off state of the address signal. The addressing is binary in the sense that each mirror element is addressed with a high or low signal that indicates whether or not the mirror element is to reflect light to the image plane. The DMD is "loaded" by storing input data in the memory cells, via a data loading circuit peripheral to the DMD's array of mirror elements.

Pixel data is delivered to the memory cells of the DMD in a special "bit-plane" format. This format arranges the data for each frame by the bit-weights of all pixels rather than pixel-by-pixel. This format permits greyscale images to be generated by addressing each mirror element with successive address signals during a frame period, each address signal representing a different bit weight of that mirror element's n-bit pixel value. The more significant the bit-weight of the bit being used for addressing, the longer the mirror element remains on. For the brightest intensity, the mirror element would be on each time it is addressed. This is essentially pulse width modulation, with many variations possible. Moving images can be generated by re-addressing the DMD with data for successive frames.

For color images, one approach is to use three DMDs, one for each primary color (R,G, B). The light from corresponding pixels of each DMD is converged so that the viewer perceives the desired color. Another approach is to use a single DMD and a color wheel having sections of primary colors. Data for different colors is sequenced and synchronized to the color wheel so that the eye integrates sequential images into a continuous color image. A third approach uses two DMDs, with one switching between two colors and the other displaying a third color.

As with all display systems, the quality of the images from a DMD-based display system is improved by eliminating artifacts. Potential artifacts include temporal contouring, which appears as flashing or banding when the observer blinks, moves his eyes, or waves his hands in front of his eyes. Another artifact is motion contouring, which appears as false contours that appear when the eye is tracking a moving object. The false contour may be a ghost image at sharp edges or an artificial contour in smoothly varying regions. Still another type of artifact is unique to DMD display systems that use a method of data loading known as memory-multiplexing.

SUMMARY OF THE INVENTION

One aspect of the invention is a method of reducing artifacts in an image display system having multiple memory-multiplexed spatial light modulators (SLMs). In this type of system, each SLM concurrently displays images based on data representing a different color, and the images are combined at the image plane. The SLMs have "corresponding" SLM rows, which are rows that have corresponding row positions. For memory multiplexing, the rows of the SLMs are connected in reset groups. Each reset group is comprised of a number of rows of each SLM, and corresponding SLM rows are not in the same reset group. During loading of data to the SLMs, a first reset group is loaded with data having a certain bit-weight of pixel data. This data is displayed, while a next reset group is loaded with data having a certain bit-weight of pixel data. These loading and displaying steps are repeated for each reset group and for each bit-weight of the pixel data.

An advantage of the invention is that because reset groups do not contain corresponding SLM rows, artifacts due to periodicity of the split reset configuration are reduced. For example, where the split reset configuration is horizontal, there is less tendency to perceive a horizontal line structure.

The invention is also useful for SLM system that use a single SLM to sequentially display images of different colors via a color wheel. In this case, there is only one set of SLM rows. The reset groups for one color have different rows than the reset groups for another color.

DETAILED DESCRIPTION OF THE INVENTION

Figure 1:
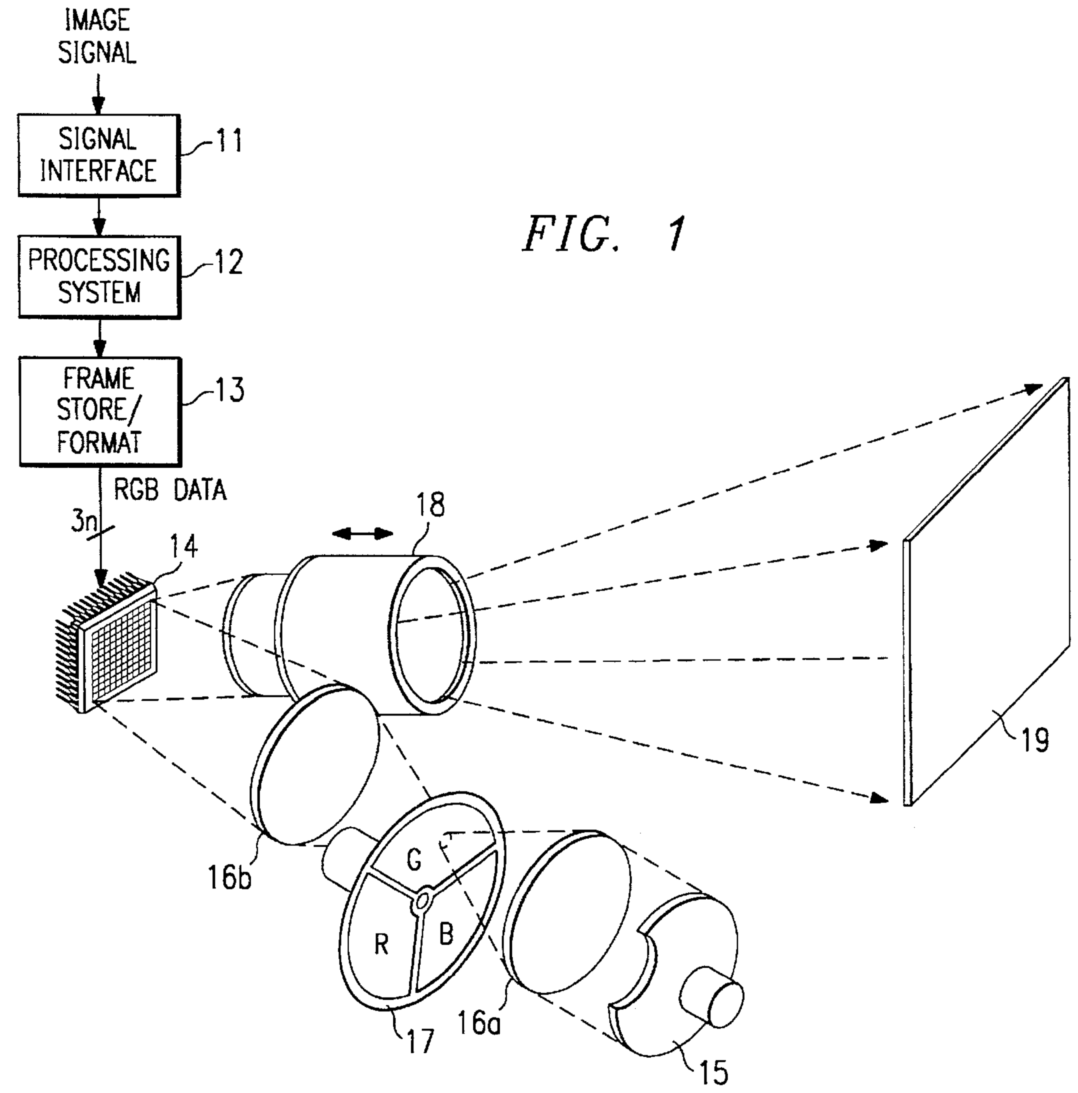
FIG. 1 is a block diagram of an SLM-based display system that uses a single SLM and a color wheel to provide color images.
Figure 2:
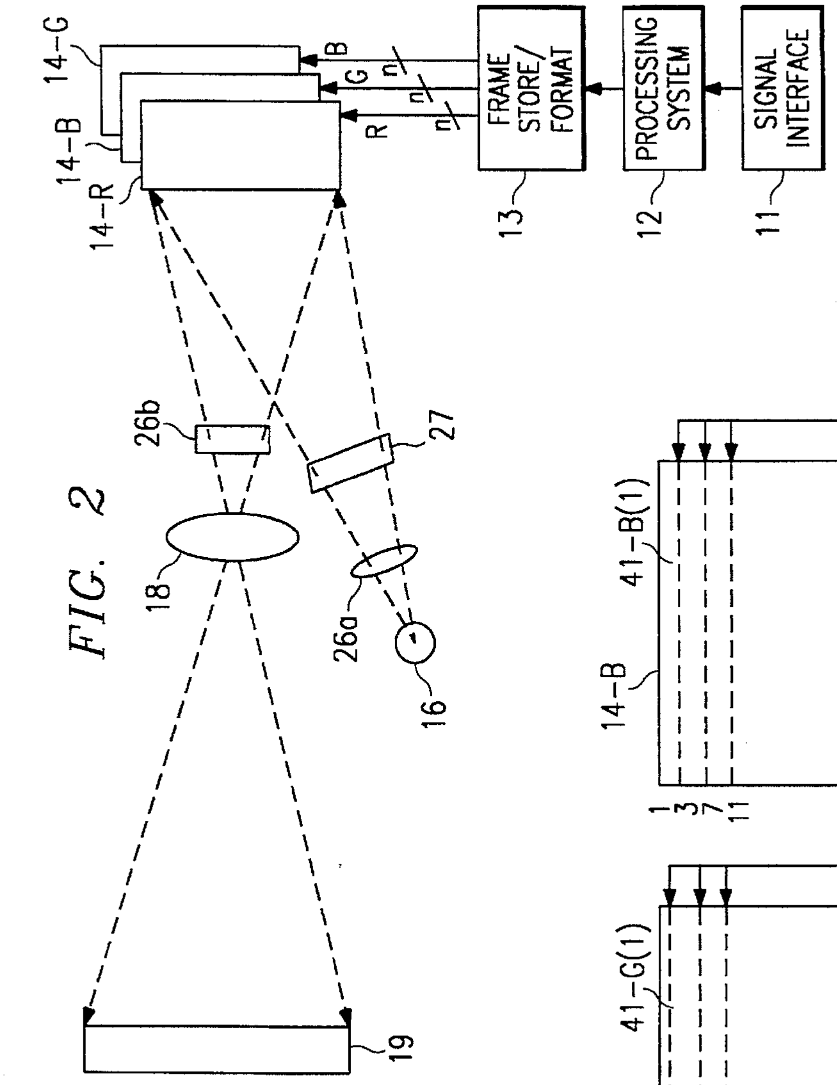
FIG. 2 is a block diagram of an SLM-based display system that uses multiple SLMs to provide color images.

FIGS. 1 and 2 are each a block diagram of a SLM-based color display system 10 and 20, respectively. System 10 uses a single SLM that sequentially displays images for different colors through a color wheel. System 20 uses three SLMs, each of which simultaneously displays data for a different color of an image. As explained below, whether the color displays are provided sequentially as in system 10 or concurrently as in system 20, each system has multiple channels of data, each channel for a different color. In general, the invention is directed to varying the timing of data on different channels so as to reduce artifacts in the displayed image.

For purposes of example, the SLM 14 of system 10 and the SLMs 14 of system 20 are DMD type SLMs. As explained below, the invention is used with memory-multiplexed SLMs. When the SLM is a DMD, this memory multiplexing is made possible by the latching characteristic of the tilting mirrors, which remain set in an on or off position until reset. Because of this characteristic, data for one set of mirror elements may be loaded to associated memory cells while another set of mirror elements is already set. This permits mirror elements to share memory cells.

The image signal received by system 10 or system 20 may be a digital signal or an analog signal that is subsequently converted to digital form. For purposes of example, the incoming signal is assumed to be an analog signal such as a broadcast television signal.

In FIGS. 1 and 2, only those components significant to main-screen processing are shown. Other components, such as might be used for processing synchronization and audio signals or for features such as closed captioning, are not shown.

System 10 and system 20 have similar "front end" components, including a signal interface 11, processing system 12, and frame memory 13, for providing digital image data to the DMD(s) 14. These components will be discussed in common for both system 10 and system 20, with the DMD(s) 14 and associated optics for the two systems being separately described. Where both system 10 and system 20 are being discussed in common, the term "DMD(s)" refers to either the single DMD 14 of system 10 or to the multiple DMDs 14 of system 20.

Signal interface 11 receives the analog input signal and separates video, synchronization, and audio signals. Signal interface 11 includes an A/D converter and a color separator, which convert the signal into pixel data and which separate the luminance data from the chrominance data, respectively. In other embodiments, color separation could be performed before A/D conversion, using analog filters.

Processor system 12 prepares the pixel data for display by performing various pixel processing tasks. Processor system 12 includes various memory devices for storing the pixel data during processing, such as field and line buffers.

One task typically performed by processor system 12 is progressive scan conversion of interlaced data, where each field of the interlaced data is converted to a complete frame. Other processing tasks are scaling, colorspace conversion, or gamma correction. During colorspace conversion, luminance and chrominance data are converted to RGB data. Gamma correction de-compensates gamma-compensated data because the linear characteristics of the DMD(s) 14 make gamma compensation unnecessary.

In the preferred embodiment, processor system 12 includes a "scan line video processor" for performing computational processing tasks, such as progressive scan conversion and scaling. This device is commercially available from Texas Instruments Incorporated, and permits line-by-line processing of pixel data.

Frame memory 13 receives processed pixel data from processor system 12. Frame memory 13 formats the data, on input or on output, into "bit-plane" format, and delivers bit-plane data to DMD(s). As discussed in the Background, the bit-plane format is one in which the pixel data is rearranged by bit-weight. This permits each pixel of DMD(s) 14 to be turned on or off in response to the value of one bit of data at a time.

In a typical display system 10, frame memory 13 is a "double buffer" memory, which means that it has the capacity for at least two display frames. The buffer for one display frame can be read out to DMD(s) 14 while the buffer for another display frame is being written. The two buffers are controlled in a "ping-pong" manner so that data is continuously available to DMD(s) 14.

DMD 14 is, as described in the Background, a binary device with on and off states of each mirror element. The bit-planes for each bit of data are loaded and displayed in a pulse-width modulation sequence. For n-bit pixel data, there are n bit-planes per frame period. During the frame period, the observer integrates the binary data to perceive various intensities of that frame's image.

Referring now to FIG. 1 and system 10, each frame of the RGB data to DMD 14 is provided one color at a time, such that each frame of data is divided into red, blue, and green data segments. The display time for each segment is synchronized to the color wheel 17, which rotates once per frame, so that the DMD 14 displays the data for one color through the color wheel 17 at the proper time. Thus, the data channels for each color (R,G, and B) are time-multiplexed so that each frame has sequential data for the different colors.

For the sequential color system 10, a light source 15 provides white light through a condenser lens **16*a*, which focuses the light to a point on the rotating color wheel 17. A second lens 16*b* fits the colored light to the size of the DMD's mirror array. Reflected light from the DMD projects an image onto the screen 19. A projection lens 18** accommodates various screen sizes.

Referring to FIG. 2 and system 20, data is provided to three DMDs 14 along three different data paths, one each for R, G, and B data. A light source 16 provides white light through a condenser lenses **26*a*, which focus the light through color filters 27. Each color filter 26 provides differently colored light (R,G, or B) to a DMD 14 that will display the data for that color. Filters 26*b* recombine the images from the DMDs 14 and focus the combined image to a projection lens 18, which focuses the image to a screen 19. A variation of system 20** is one in which one large DMD has an area for each color.

Comprehensive descriptions of both sequential color and multiple-DMD systems, such as system 10 and system 20, are set out in a number of patents and patent applications assigned to Texas Instruments Incorporated. These include U.S. Pat. No. 5,079,544, entitled "Standard Independent Digitized Video System"; U.S. Pat. No. 5,233,385, entitled "White Light Enhanced Color Field Sequential Projection"; U.S. patent application Ser. No. 07/678,761, entitled "DMD Architecture and Timing for Use in a Pulse-Width Modulated Display System"; U.S. patent application Ser. No. 08/147,249, entitled "Digital Television System"; and in U.S. patent application Ser. No. 08/146,385, entitled "DMD Display System". Each of these patents and patent applications are incorporated herein by reference.

A feature of the invention is the recognition that bit-plane displays result in a transition energy changes. For bit-plane displays, special data sequences specify the order of display times, or segments of display times, for each bit-weight of a pixel. As a simple example, a sequence for 8-bit pixel data might be 7,6,5,4,3,2,1,0, where the display times for each bit-weight occur in descending order during the frame. Every transition from one bit level to another has an associated transition energy. High transition energies can be perceived as artifacts.

One method of reducing peak energy levels is to "split" bit-weights so that the display time for each higher bit-weight is segmented during the frame rather than contiguous. For example, the display time for most significant bits might be split into two parts. Then, the data for the most significant bit (MSB) would be displayed twice during the frame period, with each of its on times being half of the total MSB time.

Figure 3:
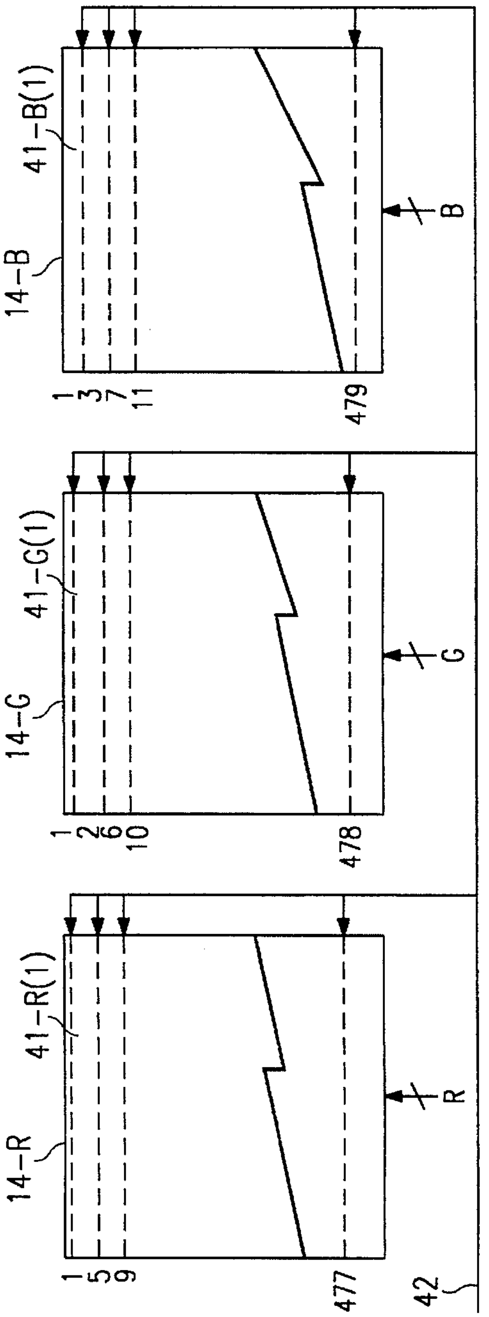
FIG. 3 illustrates a method of reducing artifacts in the system of FIG. 2 , having horizontal memory multiplexed SLMs.

FIG. 3 illustrates a display sequencing method that can be used as an alternative or as a complement to the bit-splitting method of the preceding paragraph. The method distributes the transition energy in a manner that reduces artifacts.

In the example of FIG. 3, the method is implemented on a multiple SLM system, such as system 20. Each DMD 14 receives red, green, or blue data, and each is therefore designated as DMD 14-R, 14-G, or 14-B.

The DMDs 14 of FIG. 3 are each memory-multiplexed As stated above, this means that multiple mirror elements are loaded with data from the same memory cell. Each mirror element that shares a memory cell is connected to a different reset line. For the entire DMD, there are as many reset lines as mirror elements per memory cell. The mirror elements connected to a particular reset line are a "reset group". In operation, after all memory cells for a reset group of mirror elements are loaded with data, the states of these mirror elements change in response to a reset signal on that reset line. A description of memory multiplexing and its accompanying "split-reset" data loading scheme, is set out in U.S. patent application Ser. No. 08/300,356, entitled "Pixel Control Circuitry for Spatial Light Modulator", assigned to Texas Instruments Incorporated and incorporated by reference herein.

In the example of this description, the memory multiplexing is by row (horizontal) and the fanout of mirror elements from a single memory cell is four. Thus, every four consecutive rows of mirror elements share a row of memory cells. The four rows of mirror elements that share a memory cell are a "block" of mirror elements. A DMD 14 having 480 rows of mirror elements would have 120 blocks 41. Each block 41 has four rows, which receive data from the same row of memory cells.

Figure 4:
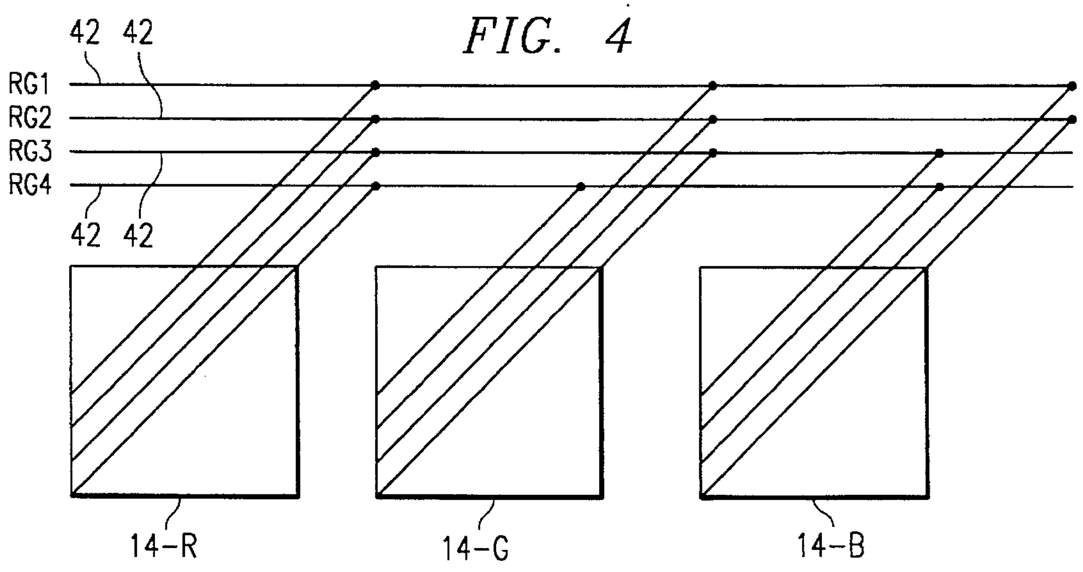
FIG. 4 illustrates the method for SLMs that are diagonally memory multiplexed.

As in typical memory-multiplexed configurations, each row is connected to one of four reset lines. In FIG. 4, only one reset line 42 is shown but there are four of them. Reset line 42 connects a reset group comprising the first row of all blocks of all three DMDs 14. Thus, a reset group contains ¼the number of rows of all DMDs 14.

Data for a reset group is loaded during one time slice. Then, while data for a next reset group is being loaded, the mirror elements of the first reset group are set on or off in response to a reset signal.

More specifically, during data loading of a frame, reset groups, which are comprised of rows with the same block row number, are loaded by bit-weight during a time slice of the frame period. A "time slice" is a portion of a frame period, and is often the display period for the least significant bit. Sometimes, the time slice is shorter to allow extra time slices, but in general, it is substantially determined by the duration of the least significant bit.

As an example of loading and displaying a frame of data on a memory-multiplexed system 20, bit n of a first reset group is loaded, then bit n of a second reset group, then bit n of the third reset group, and bit n of the fourth reset group. Next, bit n−1 of the first reset group is loaded, then bit n−1 of the second reset group, etc., until all bit-weights of all reset groups are loaded. As the data for each reset group/bit-weight is loaded, the prior reset group/bit-weight data is displayed. Although in this example, the bit-weights follow the same order for each reset group, this is not required. In fact, among reset groups, different bit-weight sequences may be advantageous. In this manner, during each frame period, all DMD rows, via their reset groups, and all bit-weights of the data for that frame are loaded and displayed.

For memory-multiplexed display systems, such as system 20, special loading and display patterns have been developed that optimize picture quality. In the example of FIG. 3, a pattern might be:

reset group 1, bit-weight sequence a reset group 2, bit-weight sequence b reset group 3, bit-weight sequence c reset group 4, bit-weight sequence d As explained in the preceding paragraph, during loading and displaying, the bit-weights of each sequence are alternated among reset groups.

The DMDs 14 of FIG. 3 have "corresponding" rows, in that the nth row of each DMD 14 is in the same position on each DMD 14. Thus, the first DMD row of each DMD 14, marked "1", receives the first row of data to be displayed. These three rows are corresponding rows. Likewise, the 480th row of each DMD 14, for a 480-row image, receives the last row of data to be displayed. These three 480th rows are corresponding rows.

As illustrated, the association between the DMD rows of a DMD 14 and its block rows is vertically offset among the DMDs 14. In other words, for a given set of corresponding rows of the DMDs 14, each DMD row is associated with a different block row. For example, the first row of DMD 14-R is associated with the first row of block 41-R(1). However, the first row of DMD 14-G corresponds to the fourth row of block 41-G(1). The first row of DMD 14-B corresponds to the third row of block 41-B(1).

Consistent with the preceding paragraph, for the first reset group, the associated DMD rows are 1, 5, 9 . . . 477 of DMD 14-R, rows 2, 6, 10, . . . 478 of DMD 14-G, and rows 3, 7, 11 . . . . 479 of DMD 14-B. Each reset group is connected in a similar pattern, with the DMD rows being connected in reset groups such that corresponding DMD rows are not in the same reset group.

As explained above, displays are generated by loading and resetting reset groups of mirror elements. When a particular reset group is displayed, the associated DMD rows do not correspond. For example, when the reset group connected to reset line 42 is displayed, the DMD rows that are displayed are rows 1,5,9, . . . 477 of DMD 14-R, rows 2,6,10, . . . 478 of DMD 14-G, and rows 3,7,11, . . . 479 of DMD 14-B.

Because of the non-uniform association between corresponding DMD rows and reset groups, the data for each color can follow the same pattern. However, the transition peaks are reduced because the transition timing is different for each color.

Although the preceding method of associating corresponding DMD rows with different reset groups is directed to horizontal memory-multiplexed DMDs 14, the same concepts apply to other memory-multiplexing configurations. For example, the memory multiplexing might be diagonal. As in the case of horizontal memory multiplexing, the fanout of each memory cell is a set of vertically consecutive mirror elements. However, the block rows are along diagonal lines, so that the data for block row n might contain the data for pixel 1 of DMD row 1, pixel 4 of DMD row 2, pixel 3 of DMD row 3, pixel 2 of DMD row 4, etc. For a DMD having n rows, there are 2n−1 block rows. Diagonal memory multiplexing is further described in U.S.

patent application Ser. No. 08/300,356, incorporated by reference above.

FIG. 4 illustrates 8×8 pixel portions of three SLMs 14, configured for diagonal split reset in accordance with the invention. There are four reset lines 42, each for a different reset group. Four sets of corresponding diagonal rows of the SLMs 14 are illustrated. Corresponding diagonal rows of each DMD 14 are associated with different reset groups.

The same concepts apply to systems having only two DMDs 14. Furthermore, for a single DMD system, such as system 10, the correspondence between DMD rows and reset groups could be shifted from color to color so as to implement a sequential variation of the method of FIG. 3. For each color, the reset groups would be reconfigured to contain different SLM rows. Because the eye's integration is based on integration of energies within the frame period, proper distribution of energy levels within the frame period can reduce artifacts.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of reducing artifacts in an image display system having multiple memory-multiplexed spatial light modulators (SLMs), each SLM displaying images based on pixel data representing a different color with the images being combined at an image plane, comprising the steps of:

corresponding each row of each said SLM with one row of each other said SLM, wherein said rows from each said SLMs have a same position on that SLM, thereby identifying corresponding rows;

connecting the rows of each said SLM in reset groups, such that each reset group is comprised of a number of rows of each said SLM, and such that corresponding SLM rows are not in the same reset group;

loading a first reset group with data having a certain bit-weight of said pixel data;

displaying said data loaded to said first reset group; and repeating said loading step and said displaying step for each reset group and for each bit-weight of said pixel data, alternating among said reset groups.

2. The method of claim 1, wherein said repeating step is performed such that said bit-weights are loaded in different orders for different reset groups.

3. The method of claim 1, wherein said loading step and said displaying step are performed in two successive time slices of a frame period, said time slice being substantially determined by the display time for the data having the least significant bit weight.

4. The method of claim 1, wherein one said SLM displays data for two colors and one said SLM displays data for a third color.

5. The method of claim 1, wherein each said SLM displays data for a different color.

6. The method of claim 1, wherein said SLM is a digital micro-mirror device.

7. The method of claim 1, wherein said corresponding rows are along horizontal rows of said SLM and reset groups contain said horizontal rows.

8. The method of claim 1, wherein said corresponding rows are along diagonal rows of said SLM and said reset groups contain said diagonal rows.

9. A method of reducing artifacts in an image display system having a memory-multiplexed spatial light modulator (SLM), sequentially which displays images based on pixel data representing a different color via a color wheel:

assigning the rows of said SLM to reset groups, such that each reset group is comprised of a number of rows of said SLM;

loading a first reset group with data having a certain bit-weight of said pixel data;

displaying said data loaded to said first reset group;

repeating said loading step and said displaying step for each reset group and for each bit-weight of said pixel data of a first color, alternating among said reset groups; and repeating said assigning, loading and displaying steps for said pixel data of a second color, such that said reset groups contain different rows of said SLM than those used for said first color.

10. The method of claim 9, wherein said repeating steps are performed such that said bit-weights are loaded in different orders for different reset groups.

11. The method of claim 9, wherein said loading step and said displaying step are performed in two successive time slices of a frame period, said time slice being substantially determined by the display time for the data having the least significant bit weight.

12. The method of claim 9, wherein said reset groups contain diagonal rows of said SLM.

13. The method of claim 9, wherein said reset groups contain horizontal rows of said SLM.

14. The method of claim 9, wherein said SLM is a digital micro-mirror device.

* * * * *